(12) United States Patent
Hiroki et al.

(10) Patent No.: US 7,645,332 B2
(45) Date of Patent: Jan. 12, 2010

(54) NON-AQUEOUS INK COMPOSITION FOR INKJET

(75) Inventors: Masashi Hiroki, Yokohama (JP);
Takaya Kitawaki, Izunokuni (JP);
Hiroshi Kiyomoto, Hiratsuka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 645 days.

(21) Appl. No.: 11/413,558

(22) Filed: Apr. 28, 2006

(65) Prior Publication Data

US 2007/0251413 A1 Nov. 1, 2007

(51) Int. Cl.
*C09D 11/02* (2006.01)

(52) U.S. Cl. .................. 106/31.6; 106/31.62; 106/31.88

(58) Field of Classification Search ................ 106/31.6, 106/31.62, 31.88
See application file for complete search history.

(56) References Cited

U.S. PATENT DOCUMENTS

| 4,822,417 | A | 4/1989 | Kobayashi et al. |
| 5,318,617 | A | 6/1994 | Nagasawa et al. |
| 5,849,814 | A | 12/1998 | Fujita |
| 7,022,172 | B2 | 4/2006 | Ohkawa et al. |
| 7,060,125 | B2 | 6/2006 | Ohkawa et al. |
| 7,311,371 | B2 * | 12/2007 | Kitawaki et al. ............. 347/14 |
| 2003/0005856 | A1 | 1/2003 | Leu et al. |
| 2003/0177948 | A1 | 9/2003 | Ohkawa et al. |
| 2004/0082684 | A1 * | 4/2004 | Nagayama et al. .......... 523/160 |
| 2005/0215664 | A1 | 9/2005 | Elwakil et al. |
| 2006/0117996 | A1 | 6/2006 | Ichikawa et al. |
| 2007/0022904 | A1 | 2/2007 | Kitawaki et al. |
| 2007/0044683 | A1 | 3/2007 | Hiroki et al. |
| 2007/0051273 | A1 | 3/2007 | Hiroki et al. |
| 2007/0131137 | A1 | 6/2007 | Kitawaki et al. |

FOREIGN PATENT DOCUMENTS

| JP | 2001-220527 A | 8/2001 |
| JP | 2002-363465 A | 12/2002 |
| JP | 2003-096370 A | 4/2003 |
| JP | 2003-261808 A | 9/2003 |
| JP | 2004-250502 A | 9/2004 |
| JP | 2004-250503 A | 9/2004 |

OTHER PUBLICATIONS

Related U.S. Appl. No. 11/216,976, filed Aug. 31, 2005; Inventors: M. Hiroki et al; Title: Ink Composition for Inkjet.
Related U.S. Appl. No. 11/221,125; filed Sep. 6, 2005; Inventors: M. Hiroki et al; Title: Ink Composition for Inkjet.
Related U.S. Appl. No. 11/299,199; filed Dec. 8, 2005; Inventors: T. Kitawaki et al; Title: Non-Aqueous Ink Composition for Ink Jet.

* cited by examiner

*Primary Examiner*—Jerry Lorengo
*Assistant Examiner*—Veronica Faison Gee
(74) *Attorney, Agent, or Firm*—Frishauf, Holtz, Goodman & Chick, P.C.

(57) ABSTRACT

A non-aqueous ink composition for inkjet which comprises a pigment, a dispersant, and a non-aqueous solvent is disclosed. The non-aqueous solvent comprises 50 to 90% by weight of a first liquid paraffin, and the balance of a second liquid paraffin, which is characterized in that an average number of carbon atom in the first liquid paraffin is 28 and an average number of carbon atom in the second liquid paraffin ranges from 23 to 27.

7 Claims, No Drawings

NON-AQUEOUS INK COMPOSITION FOR INKJET

BACKGROUND OF THE INVENTION

1. Field of the Invention

This invention relates to a non-aqueous ink composition for inkjet.

2. Description of the Related Art

In recent years, a recording apparatus using an inkjet system is widely employed in various fields including not only at home but also in the office and other industrial applications. In the recording apparatus of inkjet system, an aqueous ink, a non-aqueous ink or a UV ink is employed depending on the purpose of use. Among these inks, although the aqueous ink is extensively employed because of its low cost and safety, the ink is accompanied with a problem that the ink cannot be quickly dried as it is applied to a high-speed printing. Moreover, when the aqueous ink is printed on plain paper (PPC paper), the paper is cockled subsequent to the drying of ink, thus generating so-called cockling. Since the UV ink can be quickly cured as soon as UV rays are irradiated, it is suited for use in the printing to non-absorptive media or in high-speed printing. However, it requires a UV irradiation device which is bulky and necessitates large power consumption.

Whereas, when the non-aqueous ink is employed for the printing on plain paper, the droplets of ink delivered from the inkjet head and impinged against a recording paper can be immediately penetrated into the recording paper within a short time. Therefore, the non-aqueous ink is applicable to high-speed printing without necessitating any particular mechanism, thus obtaining excellent printing images without generating cockling. Further, there has been proposed to use liquid paraffin (for example, (Moresco white P-40; Muramatsu Sekiyu Research Institute) as a solvent for the non-aqueous ink. Liquid paraffin is colorless, odorless, safe to human organism and hence suited for use as a solvent for the non-aqueous ink.

BRIEF SUMMARY OF THE INVENTION

The images printed are usually preserved by sandwiching them in a transparent file in the office and at home. As for the material of transparent file to be employed in the office and at home, a PP (polypropylene) film is predominantly employed. In this case, the images printed using the non-aqueous ink are left sandwiched between PP films for a while, the film is more likely to be swelled and cockled. Under some circumstances, the film may be deformed as large as more than 1 mm and damaged.

Therefore, an object of the present invention is to provide a non-aqueous ink composition for inkjet which would not cause the swelling or substantial deformation of the transparent file to be commonly employed in the office or at home and is capable of exhibiting excellent delivery stability.

According to one aspect of the invention, there is provided a non-aqueous ink composition for inkjet which comprises a pigment, a dispersant, and a non-aqueous solvent, wherein the non-aqueous solvent comprises 50 to 90% by weight of a first liquid paraffin, and the balance of a second liquid paraffin, an average number of carbon atom in the first liquid paraffin being 28 and an average number of carbon atom in the second liquid paraffin ranging from 23 to 27.

According to another aspect of the invention, there is provided a non-aqueous ink composition for inkjet which comprises a pigment, a dispersant, and a non-aqueous solvent, wherein the non-aqueous solvent comprises 50 to 85% by weight of a first liquid paraffin, and the balance of a second liquid paraffin, an average number of carbon atom in the first liquid paraffin being 29 and an average number of carbon atom in the second liquid paraffin ranging from 23 to 27.

Additional objects and advantages of the invention are given in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Followings are embodiments of the present invention.

The non-aqueous ink composition according to one embodiment of the present invention is prepared by dispersing a pigment in a non-aqueous solvent by using a dispersant. The non-aqueous solvent includes all kinds of solvents other than water. It has been found out by the present inventors that it is possible to obtain an non-aqueous solvent having excellent properties by combining, at a predetermine ratio, two kinds of liquid paraffin differing in average number of carbon atoms included therein. The non-aqueous solvent formulated in this manner would not cause the swelling or substantial deformation of PP film. Incidentally, unless otherwise specified, % appearing in this specification is based on weight %. The present invention has been accomplished based on the aforementioned findings.

As for the liquid paraffin a first liquid paraffin having 28 or 29 carbon atoms in average, and a second liquid paraffin having an average number of carbon atoms ranging from 23 to 27 are employed. The mixing ratio (wt %) of the first liquid paraffin in the non-aqueous solvent can be determined depending on the average number of carbon atom of the first liquid paraffin. Namely, when the average number of carbon atom in the first liquid paraffin is 28, the content of the first paraffin is within the range of 50% by weight to 90% by weight, the balance being occupied by the second liquid paraffin. On the other hand, when the average number of carbon atom in the first liquid paraffin is 29, the content of the first paraffin is within the range of 50% by weight to 85% by weight, the balance being occupied by the second liquid paraffin.

There is a preferable combination between the average number of carbon atom in the first liquid paraffin and the average number of carbon atom in the second liquid paraffin. Namely, when the average number of carbon atom in the first liquid paraffin is 28, the average number of carbon atom in the second liquid paraffin should preferably be confined within the range of 26 to 27.

Further, when the average number of carbon atom in the first liquid paraffin is 29, the average number of carbon atom in the second liquid paraffin should preferably be confined within the range of 23 to 25. In this case, the mixing ratio of the first paraffin should preferably be confined within the range of 50 to 85% by weight, more preferably 75 to 85% by weight based on a total weight of the non-aqueous solvent.

Further, when the average number of carbon atom in the first liquid paraffin is 29 and the average number of carbon atom in the second liquid paraffin is 26, the mixing ratio of the first paraffin should preferably be confined within the range of 50 to 80% by weight based on a total weight of the non-aqueous solvent. When the average number of carbon atom in the first liquid paraffin is 29 and the average number of carbon atom in the second liquid paraffin is 27, the mixing ratio of the first paraffin should preferably be confined within the range of 50 to 70% by weight based on a total weight of the non-aqueous solvent.

These preferable ranges of combination between the first liquid paraffin and the second liquid paraffin have been found out for the first time by the present inventors.

As for the liquid paraffin to be employed as the first liquid paraffin having 28 carbon atoms in average, it is possible to employ Moresco white P200 (trademark; Matsumura Sekiyu Co., Ltd.). As for the liquid paraffin to be employed as the first liquid paraffin having 29 carbon atoms in average, it is possible to employ Moresco white P230 (trademark; Matsumura Sekiyu Co., Ltd.).

As for the liquid paraffin to be employed as the second liquid paraffin having 23 to 27 carbon atoms in average, it is possible to employ Moresco white P70, Moresco white P80, Moresco white P85, Moresco white P100, Moresco white P120, Moresco white P150, (all trademark; Matsumura Sekiyu Co., Ltd.).

Further, it is also possible to employ 70-S, 80-S, 90-S, 100-S, 120-S and 150-S (all trademark; Sanko Kagaku Industries Ltd.) having 23, 24, 24, 25, 26 and 27 carbon atoms in average, respectively.

A pigment can be dispersed in these non-aqueous solvents by using a dispersant, thereby preparing a non-aqueous ink composition for inkjet according to one embodiment of the present invention.

As for the examples of pigments useful, they include photoabsorptive pigments for example. Examples of such photoabsorptive pigments include carbonaceous pigment such as carbon black, carbon refined and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

Further, it is also possible to employ organic pigments including, for example, dye chelate (basic dye type chelate, acidic dye type chelate, etc.); nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinofuranone pigment, etc.); threne pigments such as thioindigo red and indanthrone blue; quinacridone pigment; quinacridine pigment; and isoindolinone pigment.

As for the pigments that can be employed in a black ink, it is possible to employ carbon black such as Raven 5750, Raven 5250, Raven 5000, Raven 3500, Raven 1255 and Raven 700 (all available from Colombia Co., Ltd.); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (all available from Cabot Co., Ltd.); No. 2300, No. 900, MCF88, No. 33, No. 40, No. 45, No. 52, MA7, MA8, MA100 and No. 2200B (all available from Mitsubishi Chemical Co., Ltd.); Color Black FW1, Color Black FW2, Color Black FW2V, Color Black FW18, Color Black FW200, Color Black S150, Color Black S160, Color Black S170, Printex 35, Printex 45, Printex U, Printex V, Printex 140U, Special Black 6, Special Black 5, Special Black 4A and Special Black 4 (all available from Dexa Co., Ltd.).

As for the yellow pigments that can be employed in a yellow ink, examples thereof include Yellow 128, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment, etc.

As for the pigments that can be employed in a magenta ink, examples thereof include C.I. Pigment Red 122, C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, etc.

Further, as for the pigments that can be employed in a cyan ink, examples thereof include C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4, C.I. Vat Blue 60, etc.

These pigments mentioned above can be dispersed in the non-aqueous solvent generally at an amount ranging from about 1 to 25% based on a total weight of the composition.

As for the dispersant to be used for dispersing these pigments in a solvent, it is possible to employ any kind of dispersant for pigment which is generally used in a non-aqueous solvent system. Namely, it is possible to employ any desired dispersant for pigment as long as it is excellent in affinity to an non-aqueous organic solvent and is capable of stably dispersing fine particles of pigment. Examples of such a dispersant include sorbitan fatty acid ester (sorbitan monooleate, sorbitan monolaurate, sorbitan sesqueoleate, sorbitan oleate, etc.); polyoxyethylene sorbitan fatty acid ester (polyoxyethylene sorbitan monostearate, polyoxyethylene sorbitan monooleate, etc.); polyethylene glycol fatty acid ester (polyoxyethylene monostearate, polyoxyethylene glycol diisocyanate, etc.); polyoxyethylene alkylphenyl ether (polyoxyethylene nonylphenyl ether, polyoxyethylene octylphenyl ether, etc.); and nonionic surfactants such as aliphatic diethanol amide, etc.

Further, it is also possible to employ a polymeric dispersant, examples of which including styrene-maleic resin, styrene-acrylic resin, rosin, BYK-112, 116 (acrylic polymer compounds; Big Chemie Inc.), BYK-160, 162, 164, 182 (urethane polymer compounds; Big Chemie Inc.), EFKA-47, LP-4050 (urethane-based polymer compounds; EFKA Co., Ltd.), EFKA-4300 (polyacrylate-based polymer compounds; EFKA Co., Ltd.), Solsperse 13940 (polyester amine-based polymer compounds; Nippon Lubrisol Co., Ltd.), Solsperse 17000, 1800 (aliphatic amine-based polymer compounds; Nippon Lubrisol Co., Ltd.), Solsperse 22000, 24000, 28000 (polyester-based polymer compounds; LUBRIZOL JAPAN LMITED), etc.

As long as these dispersants are incorporated in the non-aqueous solvent at an amount ranging from 25 to 200% based on the weight of pigments, it is possible to expect sufficient effects thereof.

In the preparation of the non-aqueous ink composition for inkjet according to one embodiment of the present invention, a pigment and a dispersant are incorporated into a specific non-aqueous solvent at first and then the resultant mixture is subjected to a dispersion treatment by using a dispersing apparatus such as a beads mill. Then, aggregates of pigment, etc. are removed by using a filter to obtain a desired ink composition.

Next, the present invention will be further explained in detail with reference to the following examples. Incidentally, the present invention should not be construed as being limited by the following examples so long as the technical concept of the present invention is not deviated.

First of all, various kinds of liquid paraffin shown in the following Table 1 (Moresco white; Matsumura Sekiyu Co., Ltd.) were prepared. In Table 1, the names of liquid paraffin are summarized together with the average number of carbon atoms.

TABLE 1

| Name | Number of C |
|---|---|
| P60 | 21 |
| P70 | 23 |
| P80 | 24 |
| P100 | 25 |
| P120 | 26 |
| P150 | 27 |
| P200 | 28 |
| P230 | 29 |

Liquid paraffin P200 and P230 correspond to the first liquid paraffin, and liquid paraffin P70, P80, P100, P120 and P150 correspond to the second liquid paraffin. In the following examples, non-aqueous solvents were obtained through a suitable combination of these first and second liquid paraffins and the non-aqueous ink compositions for inkjet were prepared using these combinations of liquid paraffins.

EXAMPLE 1

Moresco white P200 as the first liquid paraffin and Moresco white P70 as the second liquid paraffin were combined together to obtain a non-aqueous solvent. The content of the first liquid paraffin was 90% based on the total weight of the non-aqueous solvent and the content of the second liquid paraffin was 10% based on the total weight of the non-aqueous solvent.

To the non-aqueous solvent thus obtained, channel carbon black (C.I. No. 77266, Special Black 4A; Dexa Co., Ltd.) as a pigment and Disperbyk 116 (Big Chemie Co., Ltd.) as a dispersant were added and the resultant mixture was subjected to a dispersion treatment using a beads mill. The contents of the pigment and the dispersant were 8% and 4%, respectively, based on the weight of the non-aqueous solvent. Finally, the resultant mixture was subjected to filtration using a filter of 3 μm to remove aggregates of pigment, etc., thus obtaining a non-aqueous ink composition for inkjet of Example 1.

EXAMPLES 2-29

Solvents shown in Table 1 were mixed together at ratios shown in the following Tables 2 to 4 to prepare non-aqueous solvents. The procedures of Example 1 were repeated in the same manner except that these non-aqueous solvents thus obtained were employed, thus preparing non-aqueous ink compositions for inkjet of Examples 2-29.

TABLE 2

| Liquid paraffin | Examples | | | | | | | | | |
|---|---|---|---|---|---|---|---|---|---|---|
| | 1 | 2 | 3 | 4 | 5 | 6 | 7 | 8 | 9 | 10 |
| P70 | 10 | 25 | 50 | | | | | | | |
| P80 | | | | 10 | 25 | 50 | | | | |
| P100 | | | | | | | 10 | 25 | 50 | |
| P120 | | | | | | | | | | 10 |
| P150 | | | | | | | | | | |
| P200 | 90 | 75 | 50 | 90 | 75 | 50 | 90 | 75 | 50 | 90 |
| P230 | | | | | | | | | | |

TABLE 3

| Liquid paraffin | Examples | | | | | | | | | |
|---|---|---|---|---|---|---|---|---|---|---|
| | 11 | 12 | 13 | 14 | 15 | 16 | 17 | 18 | 19 | 20 |
| P70 | | | | | | 15 | 25 | 50 | | |
| P80 | | | | | | | | | 15 | 25 |
| P100 | | | | | | | | | | |
| P120 | 25 | 50 | | | | | | | | |
| P150 | | | 10 | 25 | 50 | | | | | |
| P200 | 75 | 50 | 90 | 75 | 50 | | | | | |
| P230 | | | | | | 85 | 75 | 50 | 85 | 75 |

TABLE 4

| Liquid paraffin | Examples | | | | | | | | |
|---|---|---|---|---|---|---|---|---|---|
| | 21 | 22 | 23 | 24 | 25 | 26 | 27 | 28 | 29 |
| P70 | | | | | | | | | |
| P80 | 50 | | | | | | | | |
| P100 | | 15 | 25 | 50 | | | | | |
| P120 | | | | | 20 | 25 | 50 | | |
| P150 | | | | | | | | 30 | 50 |
| P200 | | | | | | | | | |
| P230 | 50 | 85 | 75 | 50 | 80 | 75 | 50 | 70 | 50 |

In the non-aqueous ink compositions for inkjet of Examples 1-29, an average number of carbon atoms in the first liquid paraffin was 28 and the first liquid paraffin was incorporated at an amount ranging from 50 to 90% based on the total weight of the non-aqueous solvent. In particular, in Examples 10-15, an average number of carbon atom in the second liquid paraffin was 26 or 27.

In the non-aqueous ink compositions for inkjet of Examples 16-29, the liquid paraffin having an average number of carbon atoms of 29 is included as the first liquid paraffin was 29. Further, in the non-aqueous ink compositions for inkjet of Examples 16-24, an average number of carbon atoms in the second liquid paraffin was confined within the range of 23 to 25. In Examples 25-27, an average number of carbon atoms in the second liquid paraffin was 26. In Examples 28 and 29, an average number of carbon atoms in the second liquid paraffin was 27.

As described above, in all of examples, the first liquid paraffin having 28-29 carbon atoms in average and the second liquid paraffin having 23-27 carbon atoms in average were combined at a predetermined ratio.

By following the procedures in the same manner as described in Example 1 except that the first liquid paraffin and the second liquid paraffin were mixed together as shown in the following Tables 5 and 6, non-aqueous ink compositions for inkjet of Comparative Examples 1-20 were prepared.

TABLE 5

| Liquid paraffin | Comp. Examples | | | | | | | | | | |
|---|---|---|---|---|---|---|---|---|---|---|---|
| | 1 | 2 | 3 | 4 | 5 | 6 | 7 | 8 | 9 | 10 | 11 |
| P60 | | 50 | | | | | | | 50 | | |
| P70 | | | 75 | | | | | | | 10 | 75 |
| P80 | | | | 75 | | | | | | | |
| P100 | | | | | 75 | | | | | | |
| P120 | | | | | | 75 | | | | | |
| P150 | | | | | | | 75 | | | | |
| P200 | 100 | 50 | 25 | 25 | 25 | 25 | 25 | | | | |
| P230 | | | | | | | | 100 | 50 | 90 | 25 |

TABLE 6

| Liquid Paraffin | Examples | | | | | | | | |
|---|---|---|---|---|---|---|---|---|---|
| | 12 | 13 | 14 | 15 | 16 | 17 | 18 | 19 | 20 |
| P60 | | | | | | | | | |
| P70 | | | | | | | | | |
| P80 | 10 | 75 | | | | | | | |
| P100 | | | 10 | 75 | | | | | |
| P120 | | | | | 10 | 75 | | | 50 |
| P150 | | | | | | | 10 | 75 | 50 |
| P200 | | | | | | | | | |
| P230 | 90 | 25 | 90 | 25 | 90 | 25 | 90 | 25 | |

In the Comparative Examples 1 and 8, only the first liquid paraffin was employed, and in Comparative Example 20, only the second liquid paraffin was employed.

In the Comparative Examples 2 and 9, although liquid paraffin which was relatively small in average number of carbon atom was combined with the first liquid paraffin, the average number of carbon atom was only 21.

In the Comparative Examples 3-7, the content of the first liquid paraffin having 28 carbon atoms in average was 25% based on a total weight of the non-aqueous solvent. In the Comparative Examples 10-19, the content of the first liquid paraffin having 29 carbon atoms in average was 90% or 25% based on a total weight of the non-aqueous solvent.

By using the non-aqueous ink compositions for inkjet obtained in above examples, any damage on a resin film, the viscosity at a temperature of 25° C., and delivery stability on the occasion of printing images were investigated.

In order to investigate the damage on the resin film, a solid image was printed on an area of ⅓ of the A4 size paper by using each of the non-aqueous ink compositions for inkjet. The printed image thus obtained was placed in an A4REFILE (Ra A21N; KOKUYO Co., Ltd.) and also in a transparent pocket file (No. 103; Kingjim Co., Ltd.) and was left to stand for 10 days at room temperature (25° C.). Subsequently, the damage, if any, of the resin file due to the deformation of film was evaluated according to the following criterions.

○: No deformation of film was recognized or although any deformation of film was not recognized, minute recessed dot-like portions were recognized.

Δ: Deformation of not more than 1 mm was recognized in the film.

X: Deformation of more than 1 mm was recognized in the film.

Damage to the film would be acceptable if the damage is confined within the criterions of "○" and "Δ".

In the measurement of the viscosity at a temperature of 25° C., a viscometer (TV-33 type viscometer; Tohki Sangyo Co., Ltd.) was employed. When the easiness to feed the ink to the inkjet head is taken into account, the viscosity at 25° C. should preferably be not higher than about 100 mPa·sec.

In the evaluation of the delivery stability, an image was formed on plain paper (Toshiba copy paper: P-50S) by using an image evaluation apparatus having a piezo type inkjet head (type: CB1, 318 nozzle; Toshiba TEC. Co., Ltd.). On the occasion of delivery of ink, depending on the inherent viscosity of ink, the viscosity of ink was lowered by heating the ink inside the head. Incidentally, in order to minimize the power consumption for heating the ink inside the head, the temperature of ink on the occasion of delivery should preferably be confined to 60° C. or less, more preferably 50° C. or less.

By using all of 318 nozzles of the inkjet head, a solid image having a length of 160 mm was printed to obtain a printed image. In the creation of the image, the printing was performed continuously for different period of time. More specifically, the printing was performed continuously for 10 minutes to obtain 600 copies of the image. Further, the printing was performed continuously for 20 minutes to obtain 1200 copies of the same image. Then, the number of defective printed image formed in these copies was measured to evaluate the delivery stability. Even if only one defective image was found, the delivery stability was assumed as being NG.

Incidentally, in the case of the ink having a viscosity of 42.0 mPa·s or more at 25° C., the image was formed by setting the temperature of the ink to 60° C. at the moment of the delivery thereof. In the case of the ink having a viscosity of not less than 28.5 mPa·s and less than 42.0 mPa·s at 25° C., the image was formed by setting the temperature of the ink to 50° C. at the moment of the delivery thereof.

The results obtained are summarized in the following Tables 7 to 13.

TABLE 7

| | | Examples | | | | | | | |
|---|---|---|---|---|---|---|---|---|---|
| | | 1 | 2 | 3 | 4 | 5 | 6 | 7 | 8 |
| Damage to film | | Δ | Δ | Δ | Δ | Δ | Δ | Δ | Δ |
| Viscosity (mPa · sec) | | 63.3 | 52.9 | 39.8 | 64.2 | 57.8 | 43.4 | 66.6 | 59.9 |
| Number of defective image in continuous printing | 10 minutes | 0 | 0 | 0 | 0 | 0 | 0 | 0 | 0 |
| | 20 minutes | 0 | 0 | 0 | 0 | 0 | 0 | 0 | 0 |

TABLE 8

| | | Examples | | | | | | |
|---|---|---|---|---|---|---|---|---|
| | | 9 | 10 | 11 | 12 | 13 | 14 | 15 |
| Damage to film | | Δ | ○ | ○ | ○ | ○ | ○ | ○ |
| Viscosity (mPa · sec) | | 52.6 | 67.5 | 62.4 | 54.4 | 69.2 | 66.0 | 60.9 |
| Number of defective image | 10 minutes | 0 | 0 | 0 | 0 | 0 | 0 | 0 |
| in continuous printing | 20 minutes | 0 | 0 | 0 | 0 | 0 | 0 | 0 |

TABLE 9

| | | Examples | | | | | | |
|---|---|---|---|---|---|---|---|---|
| | | 16 | 17 | 18 | 19 | 20 | 21 | 22 |
| Damage to film | | ○ | ○ | Δ | ○ | ○ | Δ | ○ |
| Viscosity (mPa · sec) | | 65.5 | 57.4 | 41.7 | 68.6 | 61.9 | 48.3 | 69.5 |
| Number of defective image | 10 minutes | 0 | 0 | 0 | 0 | 0 | 0 | 0 |
| in continuous printing | 20 minutes | 0 | 0 | 0 | 0 | 0 | 0 | 0 |

TABLE 10

| | | Examples | | | | | | |
|---|---|---|---|---|---|---|---|---|
| | | 23 | 24 | 25 | 26 | 27 | 28 | 29 |
| Damage to film | | ○ | Δ | ○ | ○ | ○ | ○ | ○ |
| Viscosity (mPa · sec) | | 65.1 | 53.2 | 69.5 | 67.8 | 57.6 | 68.1 | 64.3 |
| Number of defective image | 10 minutes | 0 | 0 | 0 | 0 | 0 | 0 | 0 |
| image in continuous printing | 20 minutes | 0 | 0 | 0 | 0 | 0 | 0 | 0 |

TABLE 11

| | | Comp. Examples | | | | | | |
|---|---|---|---|---|---|---|---|---|
| | | 1 | 2 | 3 | 4 | 5 | 6 | 7 |
| Damage to film | | ○ | X | X | X | X | X | X |
| Viscosity (mPa · sec) | | 71.5 | 35.4 | 29.9 | 36.9 | 42.5 | 47.8 | 56.2 |
| Number of defective image | 10 minutes | 2 | 0 | 0 | 0 | 0 | 0 | 0 |
| image in continuous printing | 20 minutes | 10 | 0 | 0 | 0 | 0 | 0 | 0 |

TABLE 12

| | | Comp. Examples | | | | | | |
|---|---|---|---|---|---|---|---|---|
| | | 8 | 9 | 10 | 11 | 12 | 13 | 14 |
| Damage to film | | ○ | X | ○ | X | ○ | X | ○ |
| Viscosity (mPa · sec) | | 80.0 | 37.3 | 71.4 | 30.7 | 70.2 | 37.9 | 72.9 |
| Number of defective image | 10 minutes | 5 | 0 | 1 | 0 | 1 | 0 | 2 |
| in continuous printing | 20 minutes | 11 | 0 | 4 | 0 | 4 | 0 | 7 |

TABLE 13

| | | Comp. Examples | | | | | |
|---|---|---|---|---|---|---|---|
| | | 15 | 16 | 17 | 18 | 19 | 20 |
| Damage to film | | X | ○ | X | ○ | X | X |
| Viscosity (mPa · sec) | | 43.6 | 73.8 | 49.1 | 75.7 | 57.8 | 46.1 |
| Number of defective image | 10 minutes | 0 | 2 | 0 | 4 | 0 | 0 |
| in continuous printing | 20 minutes | 0 | 8 | 0 | 8 | 0 | 0 |

As shown in Tables 7 to 10, the non-aqueous ink compositions for inkjet according to Examples were all acceptable in terms of film damage and viscosity. Moreover, the delivery stability of these inks was also excellent. It was found possible, through further optimizing the combination between the first liquid paraffin and the second liquid paraffin, to further enhance the properties of the non-aqueous ink compositions for inkjet.

In Examples 10 to 15, the first liquid paraffin having 28 carbon atoms in average and the second liquid paraffin having 26 to 27 carbon atoms in average were combined and moreover, these two kinds of liquid paraffins were mixed together at a preferable ratio. In Examples 16, 17, 19, 20, 22 and 23, the first liquid paraffin having 29 carbon atoms in average and the second liquid paraffin having 23 to 25 carbon atoms in average were combined and these two kinds of liquid paraffins were mixed together at a preferable ratio. Further, in Examples 25 to 29, the first liquid paraffin having 29 carbon atoms in average and the second liquid paraffin having 26 to 27 carbon atoms in average were combined. In these non-aqueous ink compositions for inkjet, the damage on the film was minimized. Namely, the deformation of resin film was not recognized at all or, if any, only minute recesses were merely recognized in the resin film.

Further, in the cases of non-aqueous ink compositions for inkjet of Examples 1-9, 18, 21 and 24, small deformation of 1 mm or less was merely recognized in the resin film.

When the non-aqueous ink compositions for inkjet of Examples 1-29 were employed in continuous printings of 10 minutes and 20 minutes, the defective image in the printing was not recognized at all, thus confirming excellent delivery stability of these ink compositions.

Whereas, in the cases of the non-aqueous ink compositions for inkjet of Comparative Examples, it was found impossible to secure these excellent properties.

In the cases of Comparative Examples 1 and 8 wherein the second liquid paraffin was not employed, the viscosity thereof at 25° C. was too high, thus making it impossible to perform stable delivery of ink. When the first liquid paraffin having a predetermined number of carbon atoms was combined with a liquid paraffin having 21 carbon atoms in average, damage to the resin film was found prominent as seen from the results of Comparative Examples 2 and 9.

Even if the first liquid paraffin having 28 carbon atoms in average was combined with the second liquid paraffin having 23 to 27 carbon atoms in average, if the mixing ratio of the first liquid paraffin was outside the predetermined range, the damage to the resin film would become prominent as seen from the results of Comparative Examples 3 to 7.

Even if the first liquid paraffin having 29 carbon atoms in average was combined with the second liquid paraffin having 23 to 27 carbon atoms in average, if the mixing ratio of the first liquid paraffin was too large, the viscosity thereof at 25° C. would become too high, thus making it impossible to realize stable delivery of ink as seen from the results of Comparative Examples 10, 12, 14, 16 and 18. On the other hand, when the mixing ratio of the first liquid paraffin having 29 carbon atoms in average was too small, it would result in great damage to the resin film as seen from the results of Comparative Examples 11, 13, 15, 17 and 19.

When the non-aqueous ink composition for inkjet was formed using only the second liquid paraffin without using the first liquid paraffin, deformation of more than 1 mm would be created on the resin film as seen from the results of Comparative Example 20.

When the non-aqueous ink composition for inkjet was prepared by changing the kinds of pigment, it was found possible to obtain almost the same effects. More specifically, even when a yellow ink employing, as a pigment, Hostaperm Yellow H4G (Pig.Y.151; Clariant), a magenta ink employing, as a pigment, Hostaperm Pink E-WD (Pig.P.122; Clariant), and a cyan ink employing, as a pigment, PV Fast Blue 2GLSP (Pig.Blue.15:3; Clariant) were respectively employed, it was found possible, through the employment of a non-aqueous solvent consisting of a combination of the first liquid paraffin having 28 to 29 carbon atoms in average and the second liquid paraffin having 23 to 27 carbon atoms in average which were mixed together at a predetermined ratio, to obtain inks which were capable of inhibiting any damage to the resin film. Moreover, it was also possible, through the employment of such a non-aqueous solvent, to secure excellent delivery stability of inks.

As described above, according to one embodiment of the present invention, it is possible to provide a non-aqueous ink composition for inkjet which would not give any substantial damage to the transparent file commonly employed in the offices and at home and which is excellent in delivery stability on the occasion of printing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-aqueous ink composition for inkjet which comprises a pigment, a dispersant, and a non-aqueous solvent, wherein the non-aqueous solvent comprises 50 to 90% by weight of a first liquid paraffin, and the balance of a second liquid paraffin, an average number of carbon atom in the first liquid paraffin being 28 and an average number of carbon atom in the second liquid paraffin ranging from 23 to 27.

2. The non-aqueous ink composition for inkjet according to claim 1, wherein an average number of carbon atom in the second liquid paraffin ranges from 26 to 27.

3. A non-aqueous ink composition for inkjet which comprises a pigment, a dispersant, and a non-aqueous solvent, wherein the non-aqueous solvent comprises 50 to 85% by weight of a first liquid paraffin, and the balance of a second liquid paraffin, an average number of carbon atom in the first liquid paraffin being 29 and an average number of carbon atom in the second liquid paraffin ranging from 23 to 27.

4. The non-aqueous ink composition for inkjet according to claim 3, wherein an average number of carbon atom in the second liquid paraffin ranges from 23 to 25.

5. The non-aqueous ink composition for inkjet according to claim 4, wherein 75 to 85% by weight of the non-aqueous solvent is the first liquid paraffin.

6. The non-aqueous ink composition for inkjet according to claim 3, wherein 50 to 80% by weight of the non-aqueous solvent is the first liquid paraffin, and an average number of carbon atom in the second liquid paraffin is 26.

7. The non-aqueous ink composition for inkjet according to claim 3, wherein 50 to 70% by weight of the non-aqueous solvent is the first liquid paraffin, and an average number of carbon atom in the second liquid paraffin is 27.

* * * * *